United States Patent
Razak

(10) Patent No.: US 11,518,530 B2
(45) Date of Patent: Dec. 6, 2022

(54) PREVENTING ELECTRICAL BREAKDOWN

(71) Applicant: ROLLS-ROYCE plc, London (GB)

(72) Inventor: Ahmed M Y Razak, Bristol (GB)

(73) Assignee: ROLLS-ROYCE plc, London (GB)

( * ) Notice: Subject to any disclaimer, the term of this patent is extended or adjusted under 35 U.S.C. 154(b) by 33 days.

(21) Appl. No.: 15/984,557

(22) Filed: May 21, 2018

(65) Prior Publication Data

US 2018/0339782 A1    Nov. 29, 2018

(30) Foreign Application Priority Data

May 24, 2017  (GB) ..................... 1708297

(51) Int. Cl.
| | | |
|---|---|---|
| *B64D 27/24* | (2006.01) | |
| *F04D 25/06* | (2006.01) | |
| *B64D 33/00* | (2006.01) | |
| *B64D 27/10* | (2006.01) | |
| *B64D 27/02* | (2006.01) | |
| *F04C 2/344* | (2006.01) | |
| *F01D 15/10* | (2006.01) | |
| *H02K 5/124* | (2006.01) | |

(52) U.S. Cl.
CPC ............ *B64D 27/24* (2013.01); *B64D 33/00* (2013.01); *F01D 15/10* (2013.01); *F04C 2/344* (2013.01); *F04D 25/06* (2013.01); *H02K 5/124* (2013.01); *B64D 27/10* (2013.01); *B64D 2027/026* (2013.01)

(58) Field of Classification Search
CPC .. B64D 27/24; B64D 33/00; B64D 2027/026; H02K 5/124; H02K 5/00; H02K 5/22; F02K 3/06; F01D 15/10
USPC .......................................................... 310/89
See application file for complete search history.

(56) References Cited

U.S. PATENT DOCUMENTS

| | | | | |
|---|---|---|---|---|
| 3,681,628 A | * | 8/1972 | Krastchew | H02K 9/005 310/54 |
| 4,662,826 A | * | 5/1987 | Nitta | F04B 37/10 417/206 |
| 5,977,645 A | | 11/1999 | Glennon | |

(Continued)

FOREIGN PATENT DOCUMENTS

| | | |
|---|---|---|
| CN | 201428517 Y | 3/2010 |
| CN | 103459853 A | 12/2013 |

(Continued)

OTHER PUBLICATIONS http://theflyingengineer.com/flightdeck/pw1100g-gtf/, retrieved Feb. 3, 2020 (Year: 2014).*

(Continued)

*Primary Examiner* — Philip E Stimpert
(74) *Attorney, Agent, or Firm* — Oliff PLC

(57) ABSTRACT

A propulsor (101) for an aircraft is shown. The propulsor comprises a propulsive fan (106), and an electric machine (108) configured to drive the propulsive fan. The electric machine has a casing containing electrical and electromechanical components, a shaft which extends outside of the casing and which is connected to the propulsive fan, and a seal to seal the casing around the shaft. A depressurisation (Continued)

system depressurises the casing below an external pressure to prevent electrical breakdown within gas in the casing of the electric machine.

12 Claims, 4 Drawing Sheets

(56) References Cited

U.S. PATENT DOCUMENTS

| | | | | |
|---|---|---|---|---|
| 8,810,098 | B2* | 8/2014 | Bright | H02K 19/106 310/103 |
| 9,083,207 | B1 | 7/2015 | Veltri et al. | |
| 2002/0190722 | A1 | 12/2002 | Singh et al. | |
| 2003/0152459 | A1* | 8/2003 | Gliebe | F01D 5/141 415/211.2 |
| 2007/0031078 | A1* | 2/2007 | Hackett | F01D 25/164 384/535 |
| 2009/0127379 | A1* | 5/2009 | Lugg | B64C 29/0066 244/12.3 |
| 2010/0083669 | A1 | 4/2010 | Foster et al. | |
| 2010/0139776 | A1 | 6/2010 | Auber | |
| 2010/0181861 | A1 | 7/2010 | Takamatsu et al. | |
| 2010/0294374 | A1 | 11/2010 | Sears et al. | |
| 2012/0227389 | A1* | 9/2012 | Hinderks | F02F 3/0084 60/317 |
| 2013/0126669 | A1* | 5/2013 | Hamann | B64C 27/12 244/60 |
| 2013/0170961 | A1 | 7/2013 | Meucci et al. | |
| 2015/0318760 | A1 | 11/2015 | Veltri et al. | |
| 2016/0355272 | A1 | 12/2016 | Moxon | |
| 2018/0127103 | A1* | 5/2018 | Cantemir | H02K 3/12 |

FOREIGN PATENT DOCUMENTS

| | | |
|---|---|---|
| EP | 2 631 489 A1 | 8/2013 |
| GB | 583798 | 6/1943 |
| GB | 583798 A | 12/1946 |
| GB | 718200 | 11/1954 |
| JP | 2005209791 A * | 8/2005 |
| JP | 2016-75285 A | 5/2016 |

OTHER PUBLICATIONS

Great Britain Search Report dated Nov. 23, 2017, issued in GB Patent Application No. 1708289.2.
Great Britain Search Report dated Nov. 23, 2017, issued in GB Patent Application No. 1708297.5.
U.S. Appl. No. 15/984,555, filed May 21, 2018 in the name of Razak, A.
U.S. Appl. No. 15/984,544, filed May 21, 2018 in the name of Razak, A.
U.S. Appl. No. 15/984,552, filed May 21, 2018 in the name of Razak, A.
Jul. 25, 2019 Office Action issued in European Patent Application No. 18 170 239.0.
Apr. 2, 2020 Office Action issued in U.S. Appl. No. 15/984,555.
Apr. 2, 2020 Office Action issued in U.S. Appl. No. 15/984,544.
Apr. 2, 2020 Office Action issued in U.S. Appl. No. 15/984,552.
Jul. 10, 2020 U.S. Office Action issued in U.S. Appl. No. 15/984,555.
Oct. 13, 2020 Office Action issued in U.S. Appl. No. 15/984,544.
Oct. 29, 2020 Office Action issued in European Patent Application No. 18 170 236.6.
Dec. 23, 2020 Office Action issued in U.S. Appl. No. 15/984,555.
Mar. 29, 2021 Office Action issued in U.S. Appl. No. 15/984,544.
Apr. 21, 2021 Office Action issued in U.S. Appl. No. 15/984,555.
Nov. 8, 2021 Office Action issued in European Patent Application No. 18 170 236.6.
Sep. 28, 2021 Office Action issued in Chinese Patent Application No. 201810507924.9.
Sep. 15, 2021 Office Action issued in U.S. Appl. No. 15/984,555.
Oct. 5, 2021 Office Action issued in U.S. Appl. No. 15/984,544.
Jan. 20, 2022 Office Action issued in U.S. Appl. No. 15/984,555.
Jan. 3, 2022 Notice of Allowance issued in U.S. Appl. No. 15/984,544.
May 10, 2022 Office Action issued in U.S. Appl. No. 15/984,555.
May 6, 2022 Office Action issued in Chinese Patent Application No. 201810507921.5.
Sep. 26, 2022 Office Action issued In U.S. Appl. No. 15/984,555.

* cited by examiner

PREVENTING ELECTRICAL BREAKDOWN

CROSS-REFERENCE TO RELATED APPLICATION

This application is based upon, and claims the benefit of priority from UK Patent Application No. 1708297.5, filed on 24 May 2017, the entire contents of which are hereby incorporated by reference.

TECHNICAL FIELD

This disclosure relates to the prevention of electrical breakdown in electric machines in aircraft propulsors.

BACKGROUND

At sea level, the dielectric strength of air is typically in the region of megavolts. However, in regions of low air pressure, such as experienced by aircraft at cruise altitude, the dielectric strength may drop to the order of only hundreds of volts.

Electric machines (a term which will be appreciated encompasses electric motors, electric generators and other electromagnetic machines and combinations thereof) are typically subjected to voltage derating as altitude increases to prevent the likelihood of electrical breakdown and the attendant phenomena such as arcing and corona, which may cause catastrophic failure modes.

Aircraft propulsion systems that use electric machines to drive a propulsive fan have been proposed. However, due to the thrust demand placed upon the propulsion system and the necessarily high voltage requirement of the electric machines in such applications, it may not be possible to circumvent the issue of electrical breakdown by simply moving to a voltage regime which will not exceed the breakdown voltage.

Measures to mitigate the risk of electrical breakdown in electric machines are therefore required.

SUMMARY

The present disclosure is directed towards a propulsor for an aircraft, and an aircraft comprising the same.

The propulsor comprises a propulsive fan and an electric machine configured to drive it. The electric machine comprises a casing containing electrical and electromechanical components, a shaft which extends outside of the casing and which is connected to the propulsive fan, a seal to seal the casing around the shaft, and a depressurisation system configured to depressurise the casing below an external gas pressure to prevent electrical breakdown within the gas the casing.

In this way, the components liable to be damaged by electrical breakdown phenomena such as arcing and corona are sealed in a casing depressurised by the depressurisation system, and work may be performed by the electric machine upon the fan via its shaft.

The electric machine may during use operate as an electric motor or an electric generator, and may operate using alternating or direct current.

The seal may comprise a labyrinth seal or a dry gas seal, or combination of the two.

In use, the depressurisation system will operate to reduce the pressure inside the casing of the electric machine below the external gas pressure. Given typical cruise altitudes, the external gas pressure will be low and thus the breakdown voltage will also be low. This may lead to electrical breakdown events. Further reduction of the gas pressure within the casing, however, results in a greater mean free path between molecules within the gas within the casing, thereby reducing the likelihood of collisions. This therefore increases the voltage required for electron avalanche initiation to a point greater than the peak operational voltage within the casing, thereby preventing electrical breakdown.

In an embodiment, the propulsor forms part of an aircraft.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
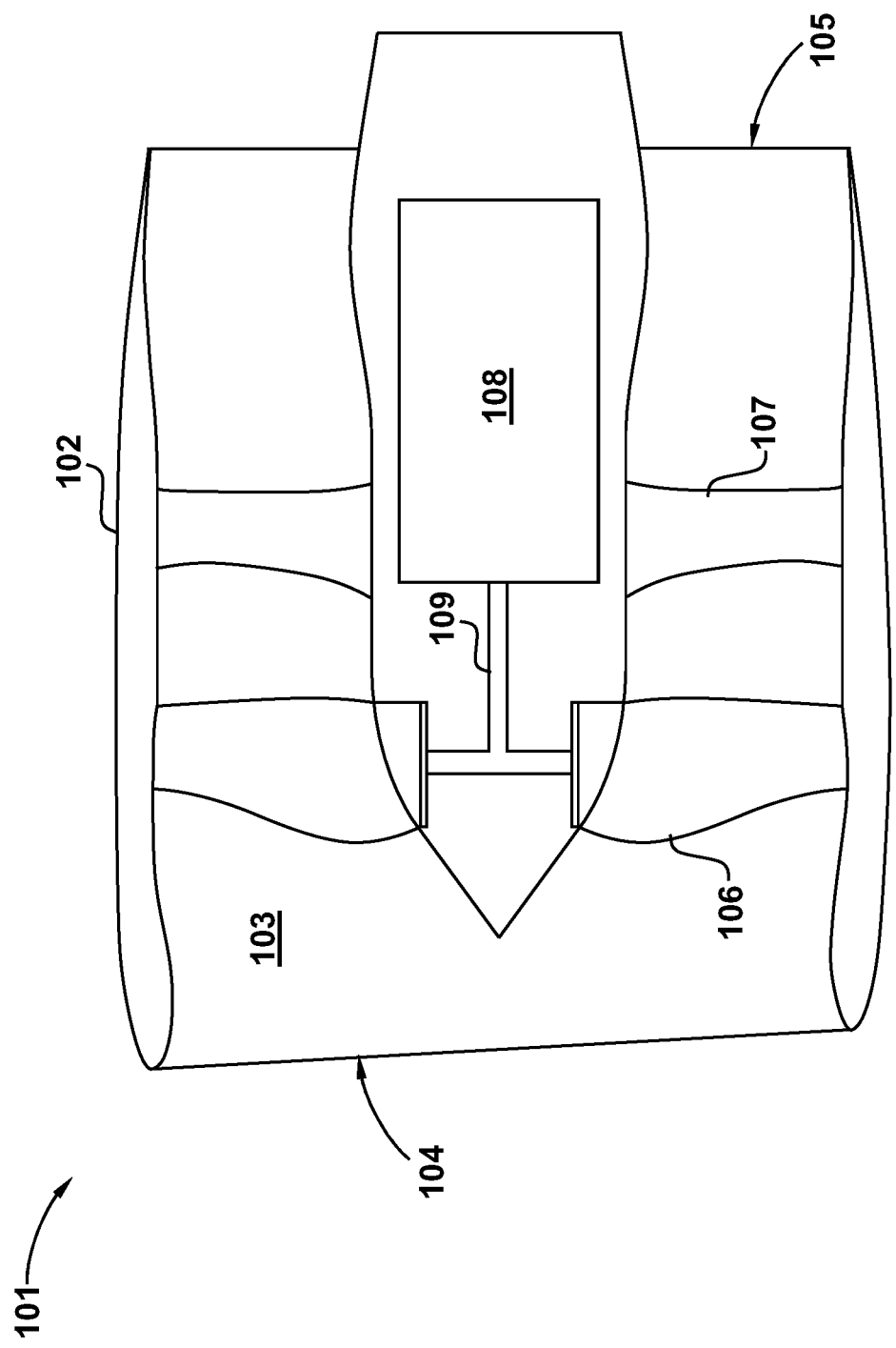
FIG. 1 shows a propulsor for an aircraft.

An electric propulsor 101 is shown in FIG. 1, in which an electric machine is shown generally at 101.

In the present embodiment, the electric propulsor 101 is configured as a ducted fan, and thus comprises a nacelle 102 which defines a duct 103 having an inlet 104 and a nozzle 105, and in which a propulsive fan 106 is located. In operation, the fan 106 raises the pressure of intake air, with swirl in the airflow being removed by outlet guide vanes 107. The airflow is directed through the nozzle 105 to generate thrust.

In the embodiment of FIG. 1, the fan 106 is driven directly by an electric machine, shown generally at 108, via a fan shaft 109.

In an alternative embodiment, the propulsor 101 may be configured as a propfan, also known as an open rotor propulsor. A gearbox or another electric machine may be provided should the propfan be of the contra-rotating type and thus comprise an additional propulsive fan.

In another alternative embodiment, the propulsor 101 may also be of the turboelectric type, which is to say that the propulsor has a series or parallel hybrid architecture in which the propulsive fan 106 is driven by a combination of an electric machine and a gas turbine engine, for example.

In the present example, the diameter of the fan is at least 1 metre. It may additionally or alternatively be at least 2 meters in diameter. The maximum tip pressure ratio of the propulsive fan 106 during use may be at most 1.5. Said use is in the present example the aerodynamic design point, which may be cruise conditions, i.e. 0.85 Mach at 35,000 feet altitude. In an alternative embodiment, the maximum tip pressure ratio of the propulsive fan 106 during use may be at most 1.3.

In an embodiment, the maximum tip speed of the propulsive fan 106 during use may be less than 343 metres per second. In this case, said use is at maximum take-off conditions. Such a tip speed may assist in reducing noise pollution at airports.

Figure 2:
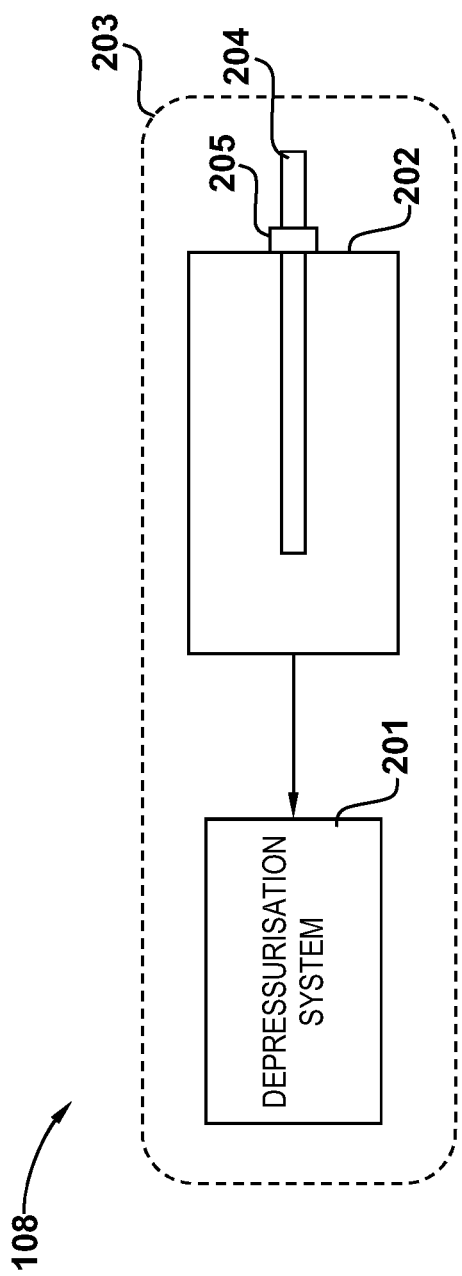
FIG. 2 shows block diagram of an electric machine according to the present disclosure.

A block diagram of the electric machine 108 is shown in FIG. 2. The electric machine 108 comprises a depressurisation system 201. The depressurisation system 201 operates to depressurise a casing 202 of the electric machine 108 below an external pressure of the environment 203 in which the electric machine 108 is located.

The casing 202 houses electrical electromechanical components (not shown) which effect the conversion of electrical power into work upon a shaft 204, or vice versa depending upon the assigned role of the electric machine 108, for example whether it is to operate as a motor or generator. It will be appreciated that the exact configuration of the electrical and electromechanical components within the casing 202 will differ according to the type of the electric machine as implemented, and thus may include coils, magnets, brushes, springs, commutators, power electronics, etc.

As the shaft extends outside of the casing, a seal 205 is provided to seal the casing around the shaft. Whilst the shaft 204 is shown extending out of only one end of the casing, it will be appreciated that the principles of the present disclosure may be extended to electric machines in which the shaft extends the full way through the casing, thus having what are commonly referred to as working and non-working ends. In such an implementation, another seal 205 would be provided to seal the casing around the two ends of the shaft.

As described previously, in one embodiment the seal 205 comprises a labyrinth seal. Labyrinth seals are characterised by a series of annular orifices used to seal a region of high pressure from one of low pressure. When gas flows from the high pressure side to the low pressure side of the seal, turbulence is caused by each annulus of the seal. Whilst this serves to minimise leakage, it does not entirely prevent it. Thus, in this example, the depressurisation system 201 operates to maintain the pressure in the casing 202 despite any leakage from environment 203 through the labyrinth seal and into the casing 202.

In an alternative embodiment, the seal 205 comprises a dry gas seal. Such seals feature zones between the stationary face of the casing and rotating face of the shaft, into which gas is pumped. When the pressure of gas in these zones exceeds the static pressure holding the faces together, the faces separate by a thin layer of gas. Dry gas seals are supplied gas at pressure via an inlet, and have an outlet for seal gas to be vented. As the zones are small, the pressure in them tends to be greater than that in the environment 203, and thus there is little leakage of gas from environment 203 through the seal 205 and into the casing 202 in such an implementation.

It will of course be appreciated that any appropriate type of seal or combination of seals may be used to prevent substantial ingress of air from the environment 203 into the casing 202.

It will be apparent that the degree of vacuum required within the casing 202 is dependent upon, with respect to any two electrodes therein, the peak operational potential difference between them, and the distance between them. Paschen's law may therefore be used to obtain, given a peak operational voltage, the maximum permitted product of pressure and distance between electrodes to prevent electrical breakdown, and therefore arcing, corona, etc.

Figure 3:
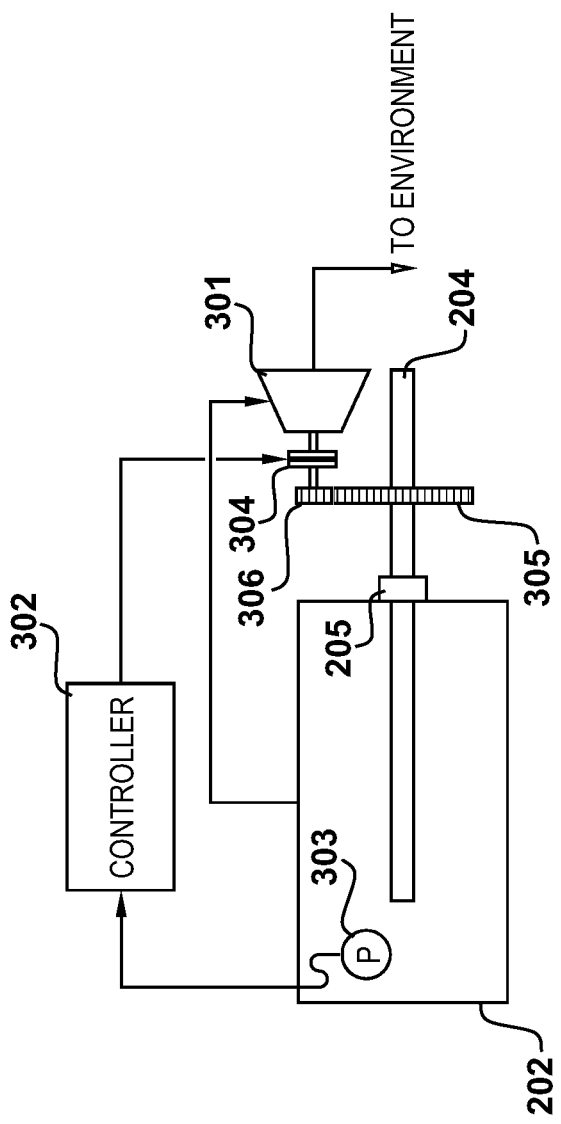
FIG. 3 shows a way of implementing the electric machine of FIG. 2.

A practical approach to implementing the electric machine of FIG. 2, is shown in FIG. 3.

In this example, the depressurisation system 201 comprises a vacuum pump 301 driven by the shaft 204. In the present embodiment, the vacuum pump 301 is a positive-displacement vacuum pump. In a specific embodiment, the positive-displacement pump is a rotary vane pump. However, it will be appreciated that the pump may be any other type of positive-displacement device such as a Roots blower.

In an alternative implementation, the vacuum pump is a centrifugal-type vacuum pump such as a radial inflow pump, or any other suitable type of vacuum pump. In addition, the vacuum pump may be multi-stage.

In order to maintain the pressure in the casing 202 at a level sufficient to prevent electrical breakdown, in the present example a controller 302 and a pressure sensor 303 within the casing are provided. The pressure sensor 303 is configured to provide the controller 302 with a signal indicative of the pressure therein, which the controller 302 is configured to utilise to control operation of the vacuum pump by means of a clutch 304. In the present example, the clutch 304 is actuated by a solenoid (not shown) connected with the controller 302, but it will be appreciated that other arrangements are possible to achieve activation/deactivation of the vacuum pump 301.

In an example, the controller 302 is an analog controller configured to implement a prescribed control loop. Alternatively, the controller may be a digital controller with software-defined logic to achieve the desired control over the pressure in the casing 202. The controller in the latter case may form part of another sub-system in the wider installation the electric machine 108 forms part of, such as a FADEC in the propulsor 101.

The control loop in the present example operates to compare the current pressure within the casing 202 to a prescribed threshold, above which electrical breakdown may occur. If the current pressure is determined to be above the threshold, the vacuum pump is enabled (i.e. the controller 302 allows to evacuate the casing 202) by engaging the clutch 304. If the current pressure is determined to be below the threshold, the vacuum pump is disabled by disengaging the clutch 304 (i.e. the controller 302 prevents it from evacuating the casing 202).

In a specific embodiment, a degree of hysteresis is included in the control loop to prevent over-actuation of the clutch 304 and vacuum pump 301. In this way, the vacuum pump 301 is only disabled once the pressure in the casing 202 is below the threshold pressure, less a lag value. As gas enters the casing 202, the pressure will rise and approach the threshold, leading to the vacuum pump 301 being enabled by the controller 302 to depressurise the casing 202. Such a control loop may be implemented using a Schmitt trigger or similar, or as one or more conditional statements in a software implementation.

The vacuum pump 301 is, in the present example, geared to the shaft 204 in order to drive the pump at the requisite angular rate to evacuate the casing 202. In the present example, this is achieved by a combination of a gear 305 on the shaft 204 meshed with a pinion 306 to drive the vacuum pump 301 via the clutch 304. It will be appreciated that the gear ratio will be in practice be dependent upon a combination of the angular rate required for the vacuum pump 301, and the operational rate of the electric machine 108. In a specific embodiment, the gear system used to connect the vacuum pump to the shaft is a magnetic gear.

In a further variation, the vacuum pump 301 may instead be geared to the shaft using a variable transmission, possibly a variable magnetic gear. In this way, the clutch 304 may be omitted, and the vacuum pump's speed and therefore pressure ratio varied by the controller 302 to maintain the pressure in the casing 202 at a fixed value, or within an acceptable defined range.

Gearing may be omitted, of course, if the electric machine 108 is to operate at same angular rate as required by the vacuum pump 301.

Figure 4:
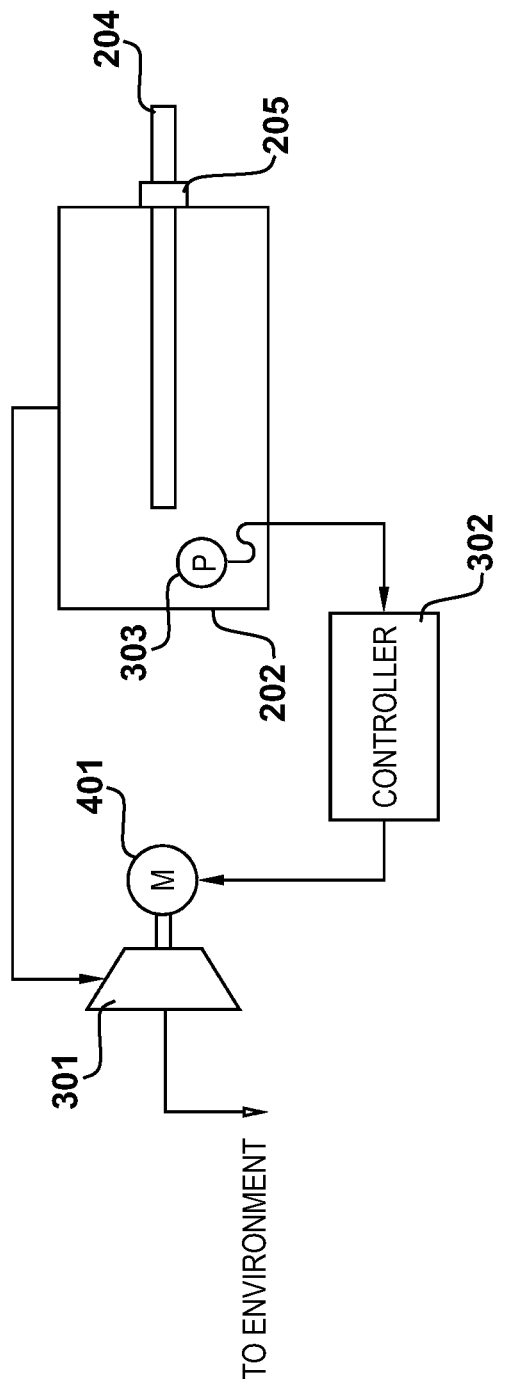
FIG. 4 shows another way of implementing the electric machine of FIG. 2.

Another approach to implementing the electric machine of FIG. 2, is illustrated in FIG. 4.

In this example, the depressurisation system 201 comprises vacuum pump 301, but in an electrically-driven configuration in which it is driven by a motor 401.

In this embodiment the motor 401 operates under the control of controller 302 which, in a similar way as described previously with reference to FIG. 3, may either enable or disable it in response to the output of pressure sensor 303 in the casing 202. Alternatively, as described previously, the controller 302 may vary the speed of the motor 401 so as to maintain the pressure in the casing 202 at a fixed value or within an acceptable defined range.

The motor 401 in this example operates at a much lower voltage than the electrical and electromechanical components in the casing 202. In this way, it is able to operate in low pressure environments such as may be encountered at aircraft cruise altitude without experiencing electrical breakdown, whereas breakdown could occur between the components in the casing 202 without depressurisation due to the higher voltages therein. Of course, it will be understood that the motor 401 could, in an alternative embodiment, be itself depressurised should electrical breakdown be possible due to its specification and operating environment.

One benefit of using the arrangement shown in FIG. 4 is that, prior to starting the electric machine 108, the casing 202 may be depressurised by the vacuum pump 301 driven by the motor 401. This can be of particular advantage should the electric propulsor 101 form part of an on-demand system in an aircraft in which it would not be running constantly, such as in a distributed propulsion architecture.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A propulsor for an aircraft, comprising:
    a propulsive fan;
    an electric machine configured to drive the propulsive fan, the electric machine having a casing that houses a motor, a shaft which extends from an interior of the casing to an exterior of the casing and which connects the motor to the propulsive fan, and a seal disposed on a circumference of the shaft and configured to seal the casing at a junction between the circumference of the shaft and the casing, the casing being sealed via the seal such that ingress of air into the casing from an external environment is prevented;
    a depressurisation system configured to depressurise the casing to an operational pressure that is (i) below an external pressure and (ii) sufficient to prevent electrical breakdown within gas in the casing of the electric machine, the operational pressure being further defined as (iii) a pressure level for atmospheric air that is on a left-hand side of a graph of a Paschen's law curve for the atmospheric air, the left-hand side encompassing pressures lower than an inflection point present in the Paschen's law curve for the atmospheric air;
    an engine controller configured to control the electric machine to operate the propulsive fan intermittently and on-demand; and
    a depressurisation controller configured to control the depressurisation system, the depressurisation controller being further configured to depressurise the casing to the operational pressure prior to the electric machine starting operation and the propulsive fan being operated intermittently and on-demand,
    wherein a portion of the shaft is disposed in the interior of the casing that is depressurised wherein the depressurization system comprises a vacuum pump,
    a pressure sensor configured to output an indication of the gas pressure within the casing; and
    the depressurization controller is configured to control the vacuum pump in response to the output of the pressure sensor to vary the speed of the vacuum pump to maintain the pressure within the casing below the external gas pressure.

2. The propulsor of claim 1, wherein the propulsor is configured as one of:
    a ducted fan; or
    a propfan.

3. The propulsor of claim 1, in which the diameter of the propulsive fan is at least 1 metre.

4. The propulsor of claim 1, in which the diameter of the propulsive fan is at least 2 metres.

5. The propulsor of claim 1, in which the propulsive fan has, during use, a maximum tip pressure ratio of at most 1.5.

6. The propulsor of claim 1, in which the propulsive fan has, during use, a maximum tip pressure ratio of at most 1.3.

7. The propulsor of claim 1, in which the propulsive fan has, during use, a maximum tip speed of less than 343 metres per second.

8. The propulsor of claim 1, in which the seal comprises one of:
    a labyrinth seal; or
    a dry gas seal.

9. The propulsor of claim 1, in which the vacuum pump is a positive-displacement vacuum pump.

10. The propulsor of claim 1, in which the vacuum pump is driven electrically.

11. The propulsor of claim 1, in which the depressurisation controller is configured to:
    determine that the pressure within the casing has risen above a threshold, and control the vacuum pump to evacuate the casing; and
    determine that the pressure within the casing has dropped below the threshold, and prevent the vacuum pump from evacuating the casing.

12. An aircraft including the propulsor according to claim 1.

* * * * *